United States Patent [19]

Corrington et al.

[11] Patent Number: 4,688,250

[45] Date of Patent: Aug. 18, 1987

[54] APPARATUS AND METHOD FOR EFFECTING A KEY CHANGE VIA A CRYPTOGRAPHICALLY PROTECTED LINK

[75] Inventors: Donald G. Corrington, Burlington County; Stephen D. Hawkins; Daniel M. Sable, both of Mercer County, all of N.J.

[73] Assignee: RCA Corporation, Princeton, N.J.

[21] Appl. No.: 823,537

[22] Filed: Jan. 29, 1986

[51] Int. Cl.⁴ .............................................. H04L 9/02
[52] U.S. Cl. ...................................... 380/23; 380/25; 380/44; 380/47
[58] Field of Search ............... 178/22.08, 22.09, 22.10, 178/22.15, 22.16, 22.17, 22.19, 22.14; 375/2.1; 455/26

[56] References Cited

U.S. PATENT DOCUMENTS

| | | | |
|---|---|---|---|
| 4,202,051 | 5/1980 | Davida et al. | 375/2 |
| 4,423,287 | 12/1983 | Zeidler | 178/22.08 |
| 4,460,922 | 7/1984 | Ensinger et al. | 358/122 |
| 4,484,027 | 11/1984 | Lee et al. | 178/22.13 |

OTHER PUBLICATIONS

Federal Information Processing Standards Publication 46 "Data Encryption Standard", Jan. 15, 1977.
Federal Information Processing Standards Publication 81 "DES Modes of Operation", Dec. 2, 1980.
Federal Information Processing Standards Publication 74 "Guidelines for Implementing and Using the NBS Data Encryption Standard", Apr. 1, 1981.

Primary Examiner—Salvatore Cangialosi
Assistant Examiner—Aaron J. Lewis
Attorney, Agent, or Firm—Clement A. Berard, Jr.; Robert L. Troike

[57] ABSTRACT

Messages sent from an earth station to a satellite by a command link are authenticated within the satellite before being executed. Authentication is accomplished by comparing a codeword appended to the message to a codeword generated within the satellite. This codeword is a cryptographic function of the message data and a secret operating key. A key change command from the earth station causes the satellite authenticator to generate a new operating key based a secret master key, a supplemental private code, and a publicly available initialization vector. The codeword appended to the key change command is encrypted in the new key and, if it agrees with a codeword generated by the satellite authenticator, the new key becomes the operating key and the key change function is complete.

17 Claims, 4 Drawing Figures

APPARATUS AND METHOD FOR EFFECTING A KEY CHANGE VIA A CRYPTOGRAPHICALLY PROTECTED LINK

This invention relates generally to cryptographrc communications and, more particularly, to an apparatus and method for effecting and authenticating a key change at a remote station via a cryptographically protected link.

BACKGROUND OF THE INVENTION

System configuration within a low earth orbiting satellite may be remotely controlled from an earth station using a command link. While it is usually not necessary to protect this command link against information disclosure, it is, however, vital that the satellite accept only those commands generated from its own earth station, and no other. Thus, some method of confirming the source of each command message must be implemented.

One message confirmation method involves appending to each command message a codeword which is a particular cryptographic function of the message data and a secret operating key. The satellite will then execute the command only if the appended codeword agrees with a second codeword generated within the satellite, the second codeword being based on the received message data and an identical secret operating key resident in the satellite.

The ability to generate a new secret operating key at both stations from a master key avoids several potential problems which may exist in systems which can not rekey. First, the master key does not have to be resident at the site of command generation. This allows a much higher level of security for the master key and a lower required level of security for the command site, except when the master key is present during the rekeying operation. Second, concern over the security of a single secret operating key for an entire mission, which may typically span seven to ten years, is relieved.

Some security requirements are imposed on such a rekeying system to ensure maximum protection for both the secret operating key and the master key. First, a transmitted message commanding a key change operation to a new secret operating key may not include a message authentication codeword encrypted under the current secret operating key. If it were, and the current operating key had been compromised, then the new secret operating key would be determinable. Second, for maximum protection of the master key, no information encrypted or decrypted under the master key is transmitted on the command link or transmitted from the satellite on its telemetry link.

SUMMARY OF THE INVENTION

In accordance with the principles of the present invention, a method is disclosed for use in a secure communications system wherein a message is transmitted from a first station to a second station. The message includes an authenticating codeword which is a unique cryptographic function of the message and a key. The second station includes means for authenticating a message received therein including means for generating a second codeword which is the unique cryptographic function of the message received by the second station and the key. The authenticating means further including means for comparing the authenticating codeword received by the second station with the second codeword. The disclosed method at the second station responds to a message received therein commanding a change of key from a current key to a subsequent key. The method comprises a first step of generating the subsequent key which is the cryptographic function of a third codeword and a master key, where the third codeword and the master key are known in the first and second stations. The second step is generating a fourth codeword which is the cryptographic function of a fifth codeword and the subsequent key, where the fifth codeword is known in the first and second stations. The third step is merging the key change command message with the fourth codeword to produce a sixth codeword. The fourth step is generating the second codeword which is the cryptographic function of the sixth codeword and the subsequent key. The fifth step is comparing the second codeword with the authenticating codeword included with the key change command message. The final step is substituting the subsequent key for the current key if the comparison of the fifth step is favorable.

DETAILED DESCRIPTION OF THE PREFERRED EMBODIMENT

Figure 1:
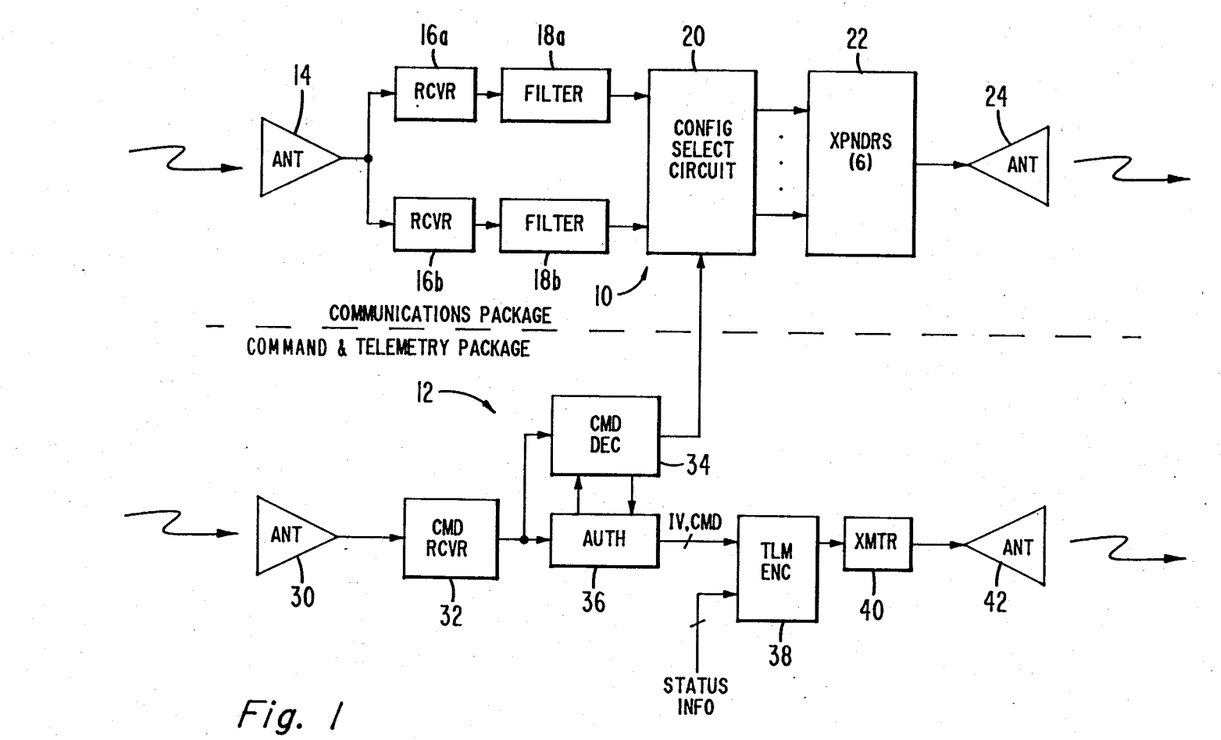
FIG. 1 is a block diagram of a satellite communications and telemetry system in which the present invention finds application.

Referring to FIG. 1, there is shown in block diagram representation the communications package 10 and command and telemetry package 12 of a typical communications satellite. Communications package 10 includes a receiving antenna 14 coupled at its output to redundant receivers 16a and 16b. Receivers 16a and 16b receive information signals modulating a first carrier frequency, typically 6 gigahertz, and translate the carrier signal to a second frequency, typically 4 gigahertz. The output signals of receivers 16a, 16b are coupled, respectively, to filters 18a, 18b, which may typically be bandpass filters centered at 4 gigahertz. The filtered output signals are applied to a configuration selection circuit 20 in which the received signals are selectively coupled to a predetermined number of transponders 22. As an example, for purposes of reliability, there may be six transponders 22, of which four are active at all times. Control of the configuration selection circuit 20 is provided by command decoder 34, which will be discussed in relation to the command and telemetry package 12. The output signals from transponders 22 are combined and applied to antenna 24 for transmission to an earth station.

Command and telemetry package 12 includes antenna 30 which receives command signals via a command link, typically at a data rate of 100 bits per second, and couples them to a command receiver 32 which demodulates the data bursts and converts them to a digital stream. Command data is applied to command decoder 34 and to authenticator 36. Command decoder 34 determines from the digital data stream the command to be executed, and enables particular bits of the data stream into authenticator 36 to verify that the command data was validly encrypted. If authenticator 36 finds favorably, it enables command decoder 34 to execute the command. The structure and method of authenticator 36, particularly as they are implemented to execute and verify a key change command, are the subject matter of the present invention.

Authenticator 36 provides certain information signals including the last received command and a variable initialization vector codeword to a telemetry encoder 38, which also receives a multiplicity of status information signals from other systems of the satellite. Telemetry encoder 38 assembles its input signals into a codeword which is coupled serially to transmitter 40 which modulates a carrier frequency signal with a data stream comprising the codeword. The modulated signal is applied to antenna 42 which radiates the signal via a telemetry link to the earth station.

As was suggested earlier in the background statement, it is not the purpose of the system of FIG. 1 to protect the command link from unauthorized detection of the command signal transmissions. Rather, its purpose is to prevent commands generated by unauthorized sources from altering the configuration of the satellite systems resulting, ultimately, in the hostile takeover of control of the satellite. Thus, the earth station generates unencrypted command signals to satellite telemetry package 12, but appends to each command message a message authentication code (MAC) to be used for authentication of the command. The MAC is computed as a cryptographic function of the message data. Only those knowing the secret key, used to compute the MAC, can recompute the MAC for the received message and verify that the message has not been transmitted from or modified by an unauthorized source, by comparing the computed MAC with the MAC received at the end of the command message data.

A typical encryption method meeting these requirements, i.e., protection of command integrity while permitting message disclosure, may be implemented using the National Bureau of Standards (NBS) Data Encryption Standard, as described in Federal Information Processing Standards Publication No. 46, dated Jan. 15, 1977. It is this data encryption standard which will serve as the example for the balance of the description of the preferred embodiment. More particularly, the present invention uses the cipher feedback (CFB) mode for data authentication, as described in the cited reference and explained in greater detail in "DES Modes of Operation," FIPS Publication No. 81, Dec. 2, 1980, and "Guidelines for Implementing and Using the NBS Data Encryption Standard," FIPS Publication No. 74, Apr. 1, 1981.

Stated briefly, generation of a message authentication code (MAC) in the CFB mode involves the following two steps: (a) a cipher text is produced by encrypting a publicly-available codeword with a secret key, using the Data Encryption Standard; and (b) this cipher text is exclusive OR'ed with a portion of the message data and the result encrypted with the secret key using the Data Encryption Standard for a second time. The output codeword from the second execution using the encryption device is the MAC. The message authentication process involves repeating the steps for generating a MAC, and comparing the generated MAC with the MAC received at the end of the message.

In the system of the present invention, the publicly-available codeword comprises a 24-bit word, referred to as the "initialization vector" (IV). The IV may be updated, typically by incrementing it by one, each time a command message is authenticated by the satellite authenticator 36. The IV is continually transmitted by the satellite to the earth station via the telemetry link. For purposes of MAC generation, forty 0's are appended to the IV to form a 64-bit codeword to be applied to the encryption device, referred to as the data encryption subsystem (DES).

The secret key used by the DES is referred to as the "operating key," and comprises a 56-bit codeword. The subject matter of the present invention relates to the apparatus and method for changing the operating key, while assuring protection of a master key and authenticating the key change command using a new operating key which cannot have been compromised.

Figure 2:
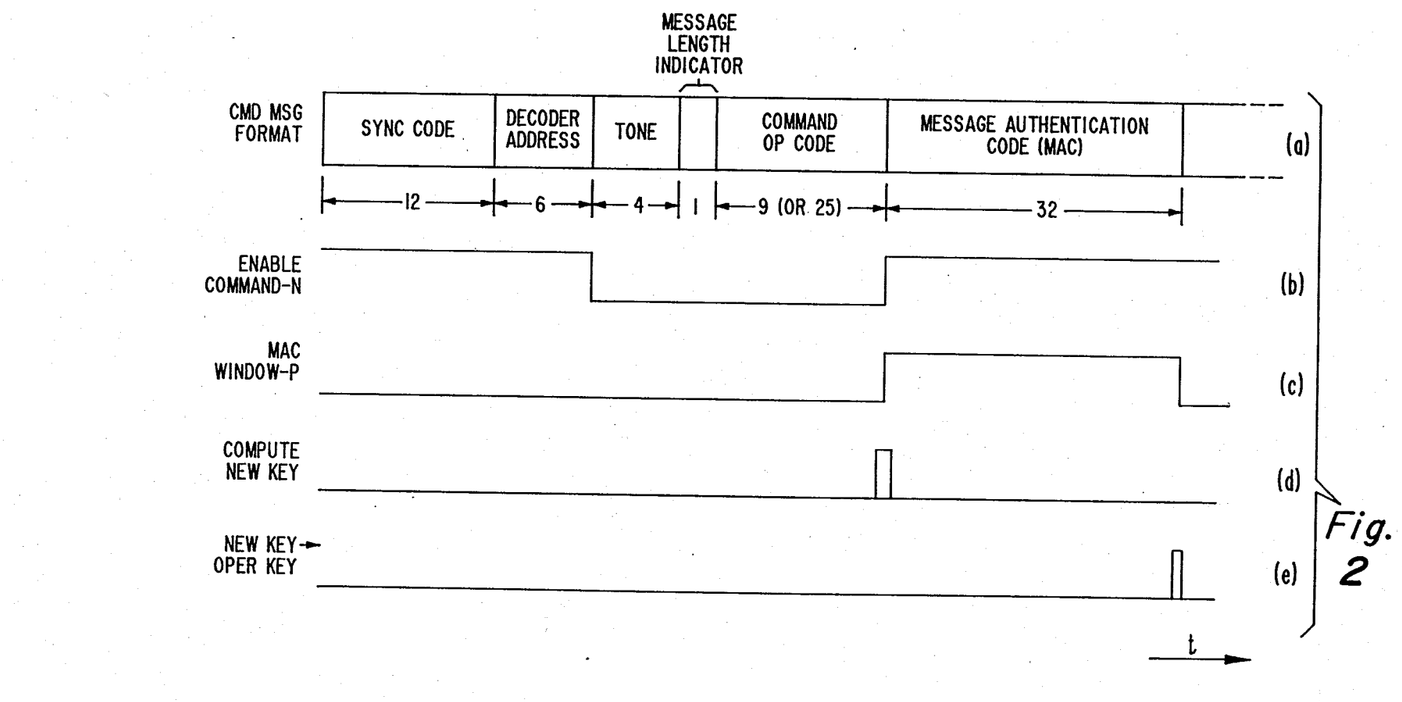
FIG. 2 illustrates the codeword format and timing information used in the key change command.

Referring now to FIG. 2(a), there is shown a codeword format which may be used for command messages by the system of FIG. 1. Each message, which may typically be transmitted at a rate of 100 bits per second, begins with a predictable pattern of twelve bits used by the receiver to synchronize its clock to the transmitted message. The next six bits of message are used by command decoder 34 to determine which decoder is being addressed. The next four bits comprise a tone which includes neither binary ones nor zeros. The next bit signifies the length of the command operation code which follows: if this bit is a zero, the command operation code is nine bits in length; if the bit is a one, the command operation code is twenty-five bits. The next nine (or twenty-five) bits comprise the command operation code, which is decoded to determine the type of operation to be executed. Typically, the operation code bits comprise eight (or twenty-four) bits of information and a single parity bit. Finally, the message concludes with thirty-two bits of a message authentication code (MAC), which is a cryptographic function of the previous ten (or twenty-six) bits of the command message.

FIG. 2(b) is a timing diagram of the ENABLE COMMAND signal provided by command decoder 34 to authenticator 36, to direct the latter device to read in the data bits following the tone information. FIG. 2(c) is a timing diagram of the MAC window provided by authenticator 36 to command decoder 34, to indicate that the MAC is being examined for the purpose of command message authentication. FIG. 2(d) shows the approximate time at which a new key is generated in response to a change key command message, and FIG. 2(e) shows the time at which the new key becomes the operating key for authenticator 36.

Figure 3:
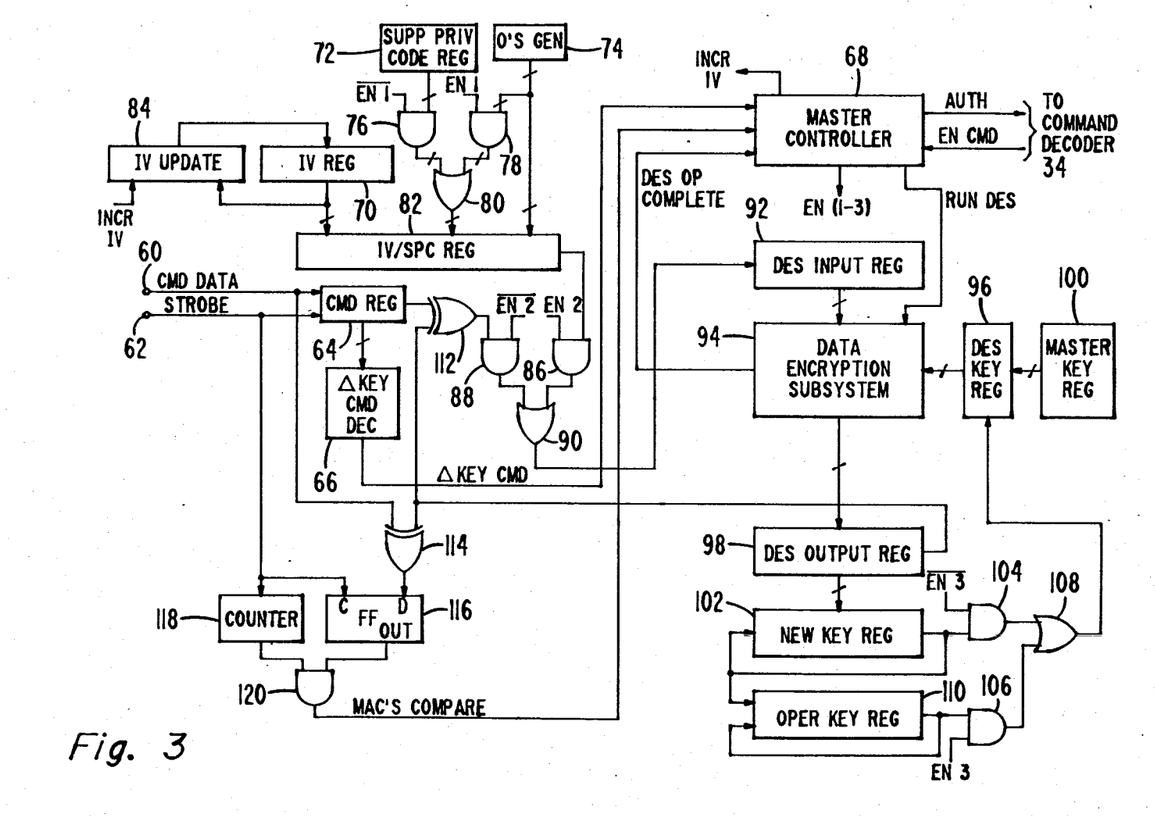
FIG. 3 is a detailed block diagram of the key change apparatus of the present invention.

Referring to FIG. 3, there is shown, in functional block diagram representation, the apparatus of authenticator 36 necessary to execute a key change operation. In the description of the apparatus which follows, reference will be made to the A- and B-series digital logic devices of the COS/MOS family, similar to those sold by, for example, RCA Corporation, Somerville, N.J. This reference is made by way of example, in order to provide a clear understanding of the invention, and is not intended to limit the invention thereby.

At the heart of that portion of authenticator 36 shown in FIG. 3 is the data encryption subsystem (DES) 94, which is typically digital logic hardware specifically configured to execute the algorithm of the NBS Data Encryption Standard. Coupled to DES 94 is a DES input register 92, typically a serially loaded, 64-bit shift register, which may be fabricated of a cascade of type CD4015 dual 4-stage, serial input, parallel output, static shift registers. Also coupled to DES 94 is a DES key register 96, typically a serial/parallel loaded, 56-bit shift register, which may be fabricated of a cascade of type CD4035 4-stage, serial/parallel input, parallel output, shift registers.

DES 94 receives 64 bits of parallel input data from register 92 and 56 bits of parallel key data from register 96, operating on them to thereby provide an encrypted data word of 64 parallel bits to DES output register 98, which may typically comprise a cascade of type CD4035 shift registers. DES 94 executes its encryption algorithm in response to a RUN DES signal from master controller 68, and indicates completion of its function via a DES OP COMPLETE signal to controller 68. In addition to controlling the operation of DES 94, controller 68 also regulates the data flow into DES input register 92 and DES key register 96, and further controls the flow of data into and out of the other registers of authenticator 36. Master controller 68 may comprise a general purpose microprocessor; alternatively, it may be a special-purpose hardware designed specifically to control the function of authenticator 36.

DES key register 96 may be parallel loaded from master key register 100 or it may be serial loaded from either new key register 102 or operating key register 110. Master key register 100 permanently stores the master key used only for changes of the operating key. Therefore, it must be fail safe and, in the case of the master key register used at the earth station, it must be capable of being kept secure. Accordingly, register 100 is preferably a hard-wired patchboard circuit or ROM which is invariant under all power supply conditions over the life of the mission. (In the earth station configuration, it is preferable that master key register 100 be pluggable, so that it can be stored in a secure location and brought to the command generation site only for key change operations.)

New key register 102 is a serial/parallel input, serial output, 64-bit shift register, which may comprise a cascade of type CD4021 8-stage, asynchronous parallel or synchronous serial input, serial output, static shift registers. The serial output of register 102 is applied to one input of AND gate 104; it is also looped back to its own serial input for recirculation.

Operating key register 110 is a serial input, serial output, 64-bit shift register, which may comprise a type CD4031 64-stage static shift register. One input of register 110 receives serial data from the output of new key register 102; the other data input of register 110 receives data recirculated from its own serial output. The output of register 110 is also applied to one input of AND gate 106.

AND gates 104 and 106 and OR gate 108 comprise an AND-OR-SELECT function which may be implemented using a type CD4019 quad AND/OR select gate. The enabling inputs to gates 104 and 106, $\overline{EN3}$ and EN3, respectively, are provided by master controller 68. The output of gate 108 is coupled to the serial input of DES key register 96.

One of the sources of serial data to the DES input register 92 is the initialization vector/supplemental private code (IV/SPC) register 82, which is a 64-bit, parallel input, serial output shift register, typically comprising a cascade of type CD4014 8-stage, parallel/serial input, serial output, synchronous shift registers. One set of data input signals to register 82, typically numbering twenty-four, is provided by initialization vector (IV) register 70. The contents of IV register 70 are periodically updated by IV update circuit 84, in response to an INCR IV signal from master controller 68. In its simplest and most preferable embodiment, IV register 70 may be a binary ripple counter, similar to a type CD4020 counter, with its outputs coupled as parallel data inputs to IV/SPC register 82. Accordingly, IV update circuit 84 may comprise a gate responsive to controller 68 for triggering the next count in register 70.

Twenty-four of the remaining forty bits to be input to IV/SPC register 82 are provided by 0's generator 74, which supplies logic "0" signals at these twenty-four input locations each time register 82 is loaded. The final sixteen data bits to register 82 are provided either by 0's generator 74 (all logic "0's") or by supplemental private code register 72. The determination as to whether register 72 or generator 74 supplies these final sixteen bits is made by sixteen AND-OR-SELECT circuits represented by AND gates 76 and 78 and OR gate 80. The selection is governed by the state of the EN1 (and $\overline{EN1}$) signals provided by master controller 68.

The supplemental private code contained within register 72 provides an additional security measure to ensure the sanctity of a key change operation. In the preferred embodiment, it is a 16-bit digital codeword known only to the system user. In practice, the owner or operator of the system may select this supplemental private code without the knowledge of the system manufacturer. Register 72, as well as the corresponding storage means for the supplemental private code at the earth station, may comprise a hard-wired patchboard circuit or a ROM, similar to the storage register 100 for the master key.

Command data is received in authenticator 36 at input terminal 60 and is enabled into command register 64 by a strobe signal originating in command decoder 34 and coupled to authenticator 36 at input terminal 62. Command register 64 is a 26-bit, serial in, serial/parallel out shift register, which may comprise a cascade of type CD4015 shift registers. The parallel output signals from register 64 are coupled to a decoder 66 which generates a ΔKEY COMMAND to controller 68 when it detects the command op code for a key change. Decoder 66 may typically comprise an 8-input AND gate, similar to type CD4068B.

The serial output data stream from command register 64 is exclusive OR'ed with the serial output data stream from DES output register 98 by gate 112, which may be a type CD4030 gate. The output of gate 112 is selectively steered, via the AND-OR-SELECT circuit comprising AND gates 86 and 88 and OR gate 90, to the serial input of DES input register 92. Alternatively, the AND-OR-SELECT circuit 86,88,90 steers the serial output from IV/SPC register 82 to DES input register 92. Selectivity of the signal applied to register 92 is governed by EN2 (and $\overline{EN2}$) generated by master controller 68.

Gate 114, which may typically be a type CD-4030, performs an exclusive OR function on the command data received at input terminal 60 and the serial data output from DES output register 98. The output signal from gate 114 is applied to the data (D) input of flip-flop 116, and is clocked in via the strobe signal coupled at input terminal 62. Counter 118, which may typically be a ripple counter similar to type CD4040, counts the number of strobe pulses accompanying a message authentication code. A count of thirty-two generates an output signal to AND gate 120, and if flip-flop 116 indicates that a favorable data comparison has been made, gate 120 sends a MAC'S COMPARE signal to controller 68.

Certain relatively trivial functions, which entail more detail than the level of FIG. 3 justifies, have been omitted from the drawing and its description. Such functions include the initial loading of register 70, the initial clearing of flip-flop 116 and counter 118, and, in general, the detailed timing functions of data transfer into and out of the registers. The implementation of these functions is well within the ordinary skill of one knowledgeable in the art.

In order to reduce electrical power consumption on board the satellite, authenticator 36 needs power applied only when its function is required. Referring to FIG. 2(a), detection of the tone portion of the command message may be used to turn power on to authenticator 36; it may then be powered-down following authentication of the command message. An exception to this power switching arrangement is the operating key register 110 and IV register 70, which must have power applied at all times in order to preserve the operating key and the initialization vector.

Figure 4:
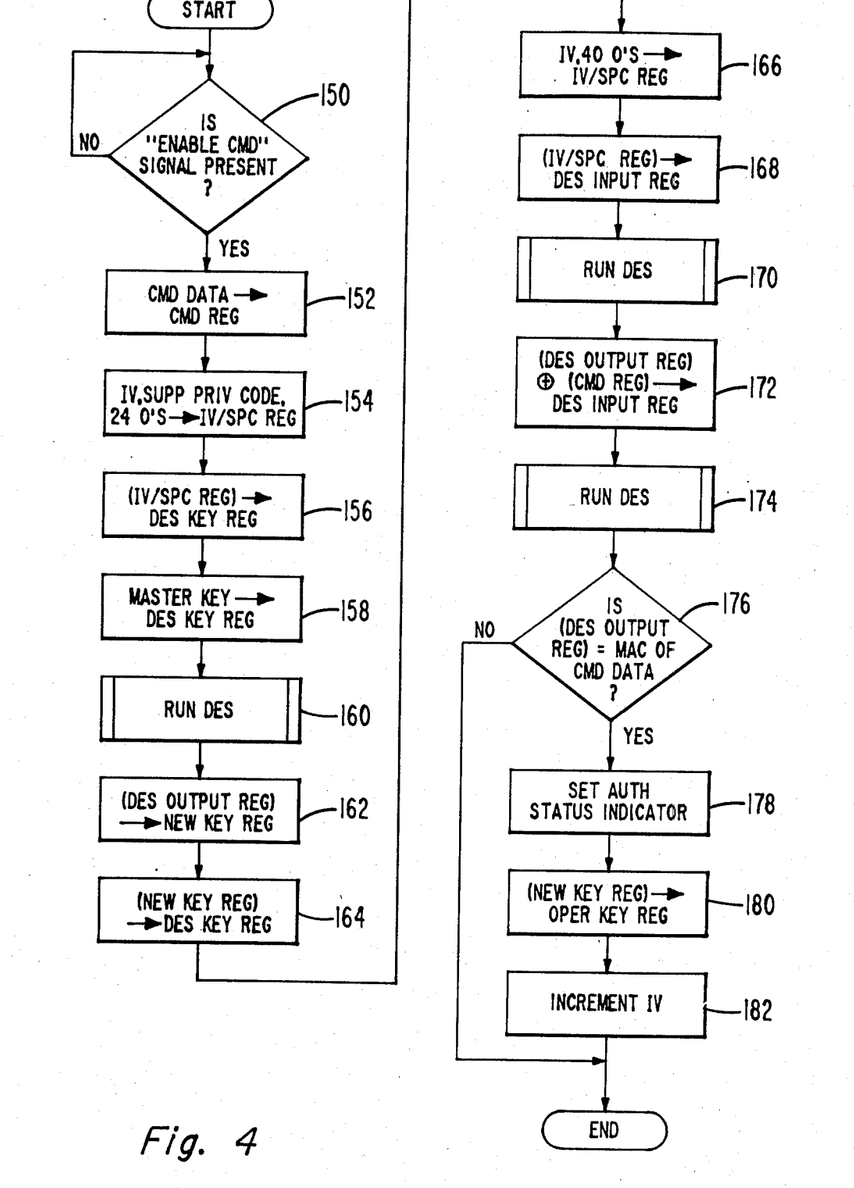
FIG. 4 is a flow diagram useful in understanding the key change operation.

Referring now to FIG. 4, there is shown a flow diagram of the steps which may be followed in order to practice the key change method of the present invention. These steps 150 through 182 may be performed by the elements of the apparatus of the FIG. 3 embodiment, or they may be executed by a special purpose data processor.

The major portions of the key change method may be grouped as follows: steps 150 and 152 store that portion of the command message necessary for generating the MAC; steps 154 through 162 compute and store the new key which, potentially, will replace the current operating key; steps 164 through 174 compute a MAC based on the new key; and steps 176 through 182 compare the computed MAC to the received MAC and, if the comparison is favorable, perform certain housekeeping functions including replacing the current operating key by the new key.

At step 150, authenticator 36 looks for the ENABLE COMMAND signal from command decoder 34 and, when present, proceeds to step 152 where the appropriate command message data coupled at input terminal 60 is stored in command register 64 using the timing provided by a strobing signal coupled at input terminal 62. At step 154 the initialization vector, which is contained in register 70, the supplemental private code, which is contained in register 72, and the 0's generated by generator 74 are enabled into IV/SPC register 82. Step 156 causes the information stored in register 82 to be serially shifted into the DES input register 92. At step 158, the master key stored in register 100 is parallel loaded into DES key register 96.

With the initialization vector and supplemental private code in the DES input register 92 and the master key in the DES key register 96, the data encryption subsystem 94 executes the NBS data encryption standard algorithm implemented in hardware therein at step 160. The information resulting from running the DES algorithm, which is stored in the DES output register 98, is parallel transferred into the new key register 102 at step 162. This codeword will become the new operating key if the received MAC compares favorably with the MAC about to be received from the earth station.

The contents of the new key register 102 are serially shifted at step 164 into the DES key register 96. At step 166, the initialization vector and forty 0's are parallel transferred into the IV/SPC register 82 and, at step 168, this data is serially shifted into the DES input register 92. The algorithm is executed once again by data encryption subsystem 94 at step 170. The DES output register 98 contents are exclusive OR'ed with the contents of command register 64 and the resulting information serially shifted at step 172 into DES input register 92. Finally, at step 174, the DES algorithm is executed a third time.

A comparison of the data in DES output register 98, following the third execution of the DES algorithm, with the MAC being received at input terminal 60 is performed by exclusive OR gate 114 at step 176. If the comparison is favorable, i.e., gate 120 sends a MAC's COMPARE signal to master controller 68, controller 68 generates an authentication signal to command decoder 34 at step 178, the contents of the new key register 102 are serially shifted to the operating key register 110 at step 180, and the initialization vector in register 70 is incremented at step 182. If the comparison between the data computed at step 174 and the received MAC is not favorable, steps 178 through 182 are bypassed, and the current key in the operating key register 110 remains as the operating key, the key change command having been rejected.

The embodiment of authenticator 36 shown in FIG. 3, using the digital logic elements of the types given by way of example in the description of that embodiment, may typically provide data transfer between registers at a rate of 256 KHz. Using this data transfer rate, it may be seen that the key change operation described with reference to FIG. 4 may be accomplished in the FIG. 3 embodiment in approximately one millisecond. It is therefore seen that, for a command link data rate of 100 bits per second, a new key is computed by authenticator 36 between the time of receipt of the last op code bit and the first MAC bit of the command message.

In conclusion, the apparatus and method for effecting a key change operation via a cryptographically protected link, while maintaining certain stringent requirements relating to protection of the key, have been described. In particular, the prohibition against transmitting a key change command having a MAC encrypted by a potentially-compromised key has been accommodated by encrypting the MAC in the new key. Furthermore, the prohibition against transmitting information encrypted under the master key via the command link is satisfied by creating an operating key as a result of encrypting the IV under the master key, generating a cipher text by encrypting the IV under the operating key, then transmitting information which is the encryption of the message data (merged with the cipher test), under the operating key.

While the principles of the present invention have been demonstrated with particular regard to the illustrated structure and method of the figures, it will be recognized that various departures from such illustrative structure and method may be undertaken in practice of the invention. As an example, the apparatus of FIGS. 1 and 3 are described as being on board an earth-orbiting satellite. This is not a necessary limitation on the invention which can be located at a terrestrial site where the resident master key and supplemental private codeword are protected from disclosure. The scope of this invention is not intended to be limited to the structure and method disclosed herein but should instead be gauged by the breadth of the claims which follow.

What is claimed is:

1. In a secure communications system wherein a message is transmitted from a first station to a second station, said message including an authenticating codeword which is a unique cryptographic function of said message and a key, said second station including means for authenticating a message received therein, said authenticating means including means for generating a second codeword which is said unique cryptographic function of the message received by said second station and said key, said authenticating means further including means for comparing said authenticating codeword received by said second station with said second codeword, a method at said second station for responding to a message received therein commanding a change of key from a current key to a subsequent key, said method comprising the steps of:
   (a) generating said subsequent key which is said cryptographic function of a third codeword and a master key, said third codeword and said master key being known in said first and second stations;
   (b) generating a fourth codeword which is said cryptographic function of a fifth codeword and said subsequent key, said fifth codeword being known in said first and second stations;
   (c) merging said key change command message with said fourth codeword to produce a sixth codeword;
   (d) generating said second codeword which is said cryptographic function of said sixth codeword and said subsequent key;
   (e) comparing said second codeword with said authenticating codeword included with said key change command message; and
   (f) substituting said subsequent key for said current key if the comparison of said comparing step is favorable.

2. The method according to claim 1 further including an antecedent step of:
   combining said fifth codeword and a supplemental codeword to produce said third codeword, said supplemental codeword being known in said first and second stations.

3. The method according to claim 2 wherein said fifth codeword of said combining step and said second generating step and said message are publicly disclosed.

4. The method according to claim 2 wherein said supplemental codeword of said combining step and said master key of said first generating step are not publicly disclosed.

5. The method according to claim 1 wherein said merging step comprises exclusive OR'ing said key change command message with said fourth codeword.

6. The method according to claim 1 wherein said substituting step further includes the substep of altering the value of said fifth codeword if the comparison of said comparing step is favorable.

7. The method according to claim 6 wherein said altering substep comprises incrementing the value of said fifth codeword by one.

8. In a secure communications system wherein a message is transmitted from a first station to a second station, said message including an authenticating codeword which is a unique cryptographic function of said message and a key, an apparatus at said second station for responding to a message received therein commanding a change of key from a current key to a subsequent key, said apparatus comprising:
   encrypting means including a data input register, a key register and an output register, said encrypting means executing an encryption algorithm to thereby generate at said encrypting means output register a codeword which is said cryptographic function of the data in said encrypting means data input register and the key in said encrypting means key register;
   a first storage register for selectively storing therein a second and a third codeword;
   a second storage register for storing a master key therein, said second and third codewords and said master key being known in said first and second stations;
   a third storage register for storing said subsequent key therein, said subsequent key being said cryptographic function of said second codeword and said master key;
   means for merging said message received in said second station with a fourth codeword to produce a fifth codeword, said fourth codeword being said cryptographic function of said third codeword and said subsequent key;
   means for comparing a sixth codeword with said authenticating codeword included with said key change command message, and for providing a signal indicative thereof, said sixth codeword being said cryptographic function of said fifth codeword and said subsequent key;
   an operating key storage register for storing said current key therein; and
   means for controlling transfer of data selectively from said first storage register and said merging means to said encrypting means data input register, selectively from said second storage register and said third storage register to said encrypting means key register, and from said encrypting means output register to said third storage register,
   said controlling means including means for initiating execution by said encrypting means,
   said controlling means further including means for transferring said subsequent key to said operating key storage register if said comparing means signal indicates favorable comparison between said sixth codeword and said authenticating codeword.

9. The apparatus according to claim 8 further including:
   storage means for storing therein said third codeword; and
   a fourth storage register for storing therein a supplemental codeword, wherein said second codeword comprises a combination of said third codeword and said supplemental codeword, said supplemental codeword being known in said first and second stations,
   said controlling means further including means for transferring said supplemental codeword from said fourth storage register to said first storage register, and for transferring said third codeword from said storage means to said first storage register.

10. The apparatus according to claim 9 wherein said means for storing said third codeword includes a binary counter.

11. The apparatus according to claim 10 further including means for altering said third codeword stored in said binary counter.

12. The apparatus according to claim 11 wherein said altering means includes means for incrementing the value of said third codeword by one.

13. The apparatus according to claim 8 wherein said comparing means includes an exclusive OR gate.

14. The apparatus according to claim 8 wherein said first storage register, said second storage register, said third storage register, said operating key storage register, said encrypting means data input register, said encrypting means key register, and said encrypting means output register all include shift registers.

15. The apparatus according to claim 8 wherein said merging means includes an exclusive OR gate.

16. The apparatus according to claim 8 wherein said controlling means includes a microprocessor.

17. The apparatus according to claim 8, wnerein said second station comprises an earth orbiting satellite.

* * * * *